(12) United States Patent
Campbell

(10) Patent No.: US 6,542,638 B2
(45) Date of Patent: Apr. 1, 2003

(54) METHOD FOR MATCHING SPATIAL PATTERNS

(76) Inventor: Shannon Roy Campbell, 14561 Colonial Dr., Westminster, CA (US) 92683

(*) Notice: Subject to any disclaimer, the term of this patent is extended or adjusted under 35 U.S.C. 154(b) by 0 days.

(21) Appl. No.: 09/788,852

(22) Filed: Feb. 21, 2001

(65) Prior Publication Data

US 2002/0154819 A1 Oct. 24, 2002

(51) Int. Cl.$^7$ ................................................ G06K 9/46
(52) U.S. Cl. ........................ 382/201; 382/203; 382/218
(58) Field of Search ................................. 382/203, 204, 382/195, 217, 218, 209, 241, 201

(56) References Cited

U.S. PATENT DOCUMENTS

| | | | |
|---|---|---|---|
| 4,783,829 A | | 11/1988 | Miyakawa et al. |
| 4,891,762 A | | 1/1990 | Chotiros |
| 5,659,633 A | * | 8/1997 | Ilan et al. .................... 382/186 |
| 5,978,507 A | * | 11/1999 | Shackleton et al. ......... 382/195 |
| RE36,656 E | * | 4/2000 | Califano et al. ............. 382/199 |
| 6,181,806 B1 | | 1/2001 | Kado et al. |
| 6,384,826 B1 | * | 5/2002 | Bern et al. ................... 345/420 |
| 6,393,159 B1 | * | 5/2002 | Prasad et al. ................ 345/420 |

OTHER PUBLICATIONS

Melkemi et al. "Fast Algorithm for Computing the Shape of a Set of Digital Points." Proc. ICIP–94, IEEE Int. Conf. on Image Processing, vol. 1, No. 1994, pp.705–709.*

Bebis et al. "Fingerprint Identification Using Delaunay Triangulation." Int. Conf. on Information Intelligence and Systems, Nov. 1999, pp.452–459.*

Li et al. "Multi–Resolution Mesh Based 3D Object Recognition." Proc. IEEE Workshop on Computer Vision Beyond the Visible Spectrum: Methods and Applications, Jun. 2000, pp.37–43.*

Choo et al. "Feature–Based Recognition of Triangulated Arbitrary Surfaces." Proc. Rensselaer's Second Int. Conf. on Compute Integrated Manufacturing, May 1990, pp.105–112.*

S.E. Palmer, "Vision Science, Photons to Phenomeuology" Mit Press Cambridge Mass. 1999 pp 394–398.

H. Bunke, B.T. Messmer, "Recent Advances in Graph Matching" Int. J. Patl. Recog. Ast. Intell. v.11, No. 1, pp 169–203, Feb. 1997.

(List continued on next page.)

Primary Examiner—Jon Chang
(74) Attorney, Agent, or Firm—Gene Scott-Patent Law & Venture Group

(57) ABSTRACT

I present a method for matching the spatial relationships between an input set of feature points and a template set of feature points. A feature point consists of a location in space and a label describing the feature at that location in space. A tessellation over the feature point locations is performed. Next, a search identifies polyhedra that have similar contents, the contents being the angles and labels associated with feature points of the polyhedra. Once a match is found, then appropriate adjacent and neighboring polyhedra are examined. Matching the node labels and angular relationships for a set of appropriate adjacent and neighboring polyhedra extends the volume over which matches exist and significantly increases the certainty that a positive match exists. Because this matching method is based on similarities in node angles and labels, it is independent of transformations in position, rotation, and scale if the angles in the polyhedra created by the tessellation are position, rotation, and scale invariant.

4 Claims, 10 Drawing Sheets

OTHER PUBLICATIONS

J.R. Ullman, "An Algorithm for Subgraph Isomorphism", J. Assoc. Comput. Machinery, v. 23, n 1, pp 31–42, 1976.

L. G. Shapiro, R. M. Haralick, A Metric for Comparing Relaltonal Descriptions IEEE Patt. Anal. Mach. Int. v.7, pp 90–99, 1985.

J. E. Hummel, I Biederman, "Dynamic Binding in a Neural Network for Shape Recognition" Phych. Rev. v99, pp 480–517, 1992.

N. Ahuja, "Dot Pattern Processing Using Voronoi Neighbourhoods", IEEE Patt. Anal. Mach. Int. v4, 336–343, 1982.

Y.–W. Chiang, R.–C. Wang, "Seal Identification Using the Delaunay Tesselation" Proc. Nat.. Sci. Counc, Roc (A) v.22, No. 6, pp 751–757, 1998.

G. Weber, L. Knipping, H.Alt "An Application of Point Pattern Matching in Astronautics", J. Symbolic Computation v.17, no. 4, 321–340, 1994.

M. Sambridge, J. Braun, H. McQueen, "Geophysical Parametrigation and Interpolation of Irregular Date Using Natural Neighbors" Geophysical Journal Int., v122, 837–857 1995.

H. Ogawa, "Labeled Point Pattern Matching by Delaunay Triangulation and Maximal Cliques" Patt. Recog. v. 19, No. 1, 1986 pp 35–40.

K.–P. Pleiber et al, "New Algorithmic Approaches to Protein Spot Detection and Pattern Matching in Two–Dimensional Electrophoresis Gel Databases" Electrophoresis, v. 20, 755–765, 1999.

R.C. Wilson, A.D.J. Cross, E.R. Hancock, "Structural Matching with Active Triangulation" Comp. Vis. Image Understanding, v. 72, No. 1, 21–38 1998.

L. Cinque, D. Yasuda, L. G. Shapiro, S. Tanimoto, B. Allen, "An Improved Algorithmic for Relational Distance Graph Matching" Patt. Rec. v.29, No. 2, 349–359, 1996.

H. Zhang & H. Yen, "Graphic Matching Based on Constrained Voronoi Diagrams" $5^{th.}$ Int. Symp. Sig. Proc. & Applications, Brisbane Austraila, 431–434, Aug. 1999.

K. Pulli and L. G. Shaprio "Triplet–Based Object Recognition Using Synthetic and Real Probability Models" Proc. Int. Conf. Patt. Recog. 1996, vol. 3v 75–79.

W. E. L. Grimson, T. Lozano–Perez "Localizing Overlapping Parts by Searching the Interpletation Tree" IEEE Trans. Patt. Anal. Mach. Int. vol. 9, No. 4, 469–481 1987.

H.–Y. F. Feng, T. Pavlidis "Decomposition of Polygons Into Simpler Components: Feature Generation for Syntactic Pattern Recognition" IEEE Trans. on Computers, v. C–24, No. 6, 1975.

* cited by examiner

METHOD FOR MATCHING SPATIAL PATTERNS

BACKGROUND OF THE INVENTION

This patent relates to the fields of visual pattern recognition, object recognition, image registration, and the matching of spatial patterns in two and higher dimensions.

References Cited

| | | | |
|---|---|---|---|
| 4,783,829 | November 1988 | Akira et al | 382/199 |
| 4,891,762 | January 1990 | Chotiros | 701/223 |
| 6,181,806 | January 2001 | Kado et al | 382/100 |

S. E. Palmer, "Vision Science, Photons to Phenomenology", MIT Press, Cambridge Mass., 1999.

S. Ullman, "High-level Vision: Object recognition and visual cognition", MIT Press, Cambridge Mass., 1996.

H. Bunke and B. T. Messmer, "Recent advances in graph matching", Int. J. Patt. Recog. Art. Intell., Vol. 11, No. 1, pp. 169–203, February 1997.

J. R. Ulmann, "An Algorithm for Subgraph Isomorphism", J. Assoc. Comput. Mach., Vol. 23, No. 1, pp. 31–42, 1976.

L. Shapiro and R. M. Haralick, "A metric for comparing relational descriptions", IEEE Patt. Anal. Mach. Int. Vol. 7, pp. 90–94, 1985.

J. E. Hummel and I. Biederman, "Dynamic binding in a neural network for shape recognition", Psych. Rev., Vol. 99, pp. 480–517, 1992.

N. Ahuja, "Dot pattern processing using Voronoi Neighbourhoods", IEEE Patt. Anal. Mach. Int. Vol. 4, pp. 336–343, 1982.

Y.-W. Chiang and R.-C. Wang, "Seal identification using the Delaunay tessellation", Proc. Nat. Sci. Council, Rep. of China, Part A: Physical Sci. and Eng., Vol. 22, No. 6, pp. 751–757, November 1998.

G. Weber, L. Knipping, and H. Alt, "An application of point pattern matching in astronautics", J. Symb. Comp., Vol. 17, No. 4, pp. 321–340, 1994.

M. Sambridge, J. Braun, and H. McQueen, "Geophysical parameterization and interpolation of irregular data using natural neighbors", Geophysical Journal International Vol. 122, pp. 837–857, 1995.

Much work has been done in object recognition. S. E. Palmer's, "Vision Science, Photons to Phenomenology", MIT Press, Cambridge Mass., 1999, and S. Ulman's "High-level Vision: Object recognition and visual cognition", MIT Press, Cambridge Mass., 1996, are works that contain more specific references to some of the basic topics on pattern recognition mentioned in this section.

Some useful pattern recognition algorithms are based on template matching. A basic description of template matching is as follows. A 'square' template is a binary array: the edges of the square are given a value of '1' and the background and central portion of the square are given a value of '0'. The edges of an input object are found and compared to the 'square' template. If the position, shape, orientation, and scale of the input object are very near to that of the 'square' template, then a correlation of the input object with the 'square' template yields a high value indicating a match. If the input object is a square, but is at a slightly different position, orientation, or scale, template matching fails. How to match identical patterns that are transformed in position, rotation, and scale is a currently unsolved problem in the field of pattern recognition.

Other object recognition algorithms have been based on analysis of the Fourier spectra of objects. These algorithms are rotation invariant, but are not scale invariant. A specific problem with this approach is that often the entire image is used and objects are not segmented prior to analysis. Thus information about multiple objects is sometimes included in the Fourier spectra. Furthermore, if half of the object is occluded, this method of shape matching fails because large scale features, or low frequency components, will be different from those stored in the matching template.

One can also approximate the shape of an object using Fourier components. Fourier components are able to represent single closed contours efficiently using the coefficients of periodic functions. A measure for the distance between the two vectors containing those coefficients is used to determine a match. This approach is rotation invariant, but not scale invariant. Furthermore, it does not represent complex two dimensional objects readily.

Another approach is structural descriptions. Structural descriptions are interesting because they have the potential to perform position, rotation, and scale invariant pattern recognition. Structural descriptions consist of graphs in which the nodes indicate some feature of the object and the connections between nodes indicate spatial relationships such as up, down, right, left, top, bottom, and middle. For example, S. E. Palmer, in his book "Vision Science, Photons to Phenomenology", MIT Press, Cambridge Mass., 1999, pp. 394, presents a structural graph for the letter 'A'. The graph for this object contains 12 nodes and 14 edges. This is a surprisingly complex graph for such a simple object. The relationship between the complexity of the object and the size of the resulting graph is unknown. Furthermore, one can construct different graphs for this object. To date, there is no consistent and automatic method of generating these structural graphs.

Another complication of structural graphs is that matching graphs is itself a complex problem. For examples of various approaches to the graph matching problem in the computer vision domain, see H. Bunke and B. T. Messmer, "Recent advances in graph matching", Int. J. Patt. Recog. Art. Intell., Vol. 11, No. 1, pp. 169–203, February 1997, J. R. Ullmann "An Algorithm for Subgraph Isomorphism" J. Assoc. Comput. Mach., Vol. 23, No. 1, pp. 31–42, 1976, and L. Shapiro and R. M. Haralick, "A metric for comparing relational descriptions", IEEE Patt. Anal. Mach. Int. vol. 7, pp. 90–94, 1985. All of these works contain algorithms that are complex and time consuming for objects with more than a few edges and nodes.

Other researchers have tried to encode spatial relationships with neural networks. J. E. Hummel and I. Biederman, "Dynamic binding in a neural network for shape recognition", Psych. Rev., Vol. 99, pp. 480–517, 1992, use neural networks to encode spatial relationships between geons in the RBC (recognition by components) theory of object recognition. These neural networks encode features such as location, orientation, and scale. While this system works for simple objects, it is unclear how the system performs on multiple objects that contain many features. This is because the system has limited capability in representing different locations, orientations, and scale. Therefore the system may fail when making fine distinctions between objects with large numbers of features.

Several other researchers use a rigid mathematical procedure (e.g. Voronoi tessellation, Delaunay triangulation, Gabriel graphs, and minimal spanning trees) to create graphs from feature points and then perform graph matching. N. Ahija, in his paper, "Dot pattern processing using Voronoi Neighbourhoods", IEEE Patt. Anal. Mach. Int. Vol. 4, pp. 336–343, 1982, suggests a relaxation labeling method to perform matching of dot patterns using Voronoi tessellation, a method both complex and time consuming for large objects. In Y.-W. Chiang and R.-C. Wang, "Seal identification using the Delaunay tessellation", Proc. Nat. Sci. Council, Rep. of China, Part A: Physical Sci. and Eng., Vol. 22, No. 6, pp. 751–757, November 1998, the authors match histograms of the areas of resulting Delaunay triangles to recognize Chinese Seals. In G. Weber, L. Knipping, and H. Alt, "An application of point pattern matching in astronautics", J. Symb. Comp., Vol. 17, No. 4, pp. 321–340, 1994, the authors use a Delaunay triangulation between stars and then look for matches in the slope and length of edges between pairs of stars, thus their algorithm is not rotation or scale invariant. A similar matching method is proposed in N. P. Chotiros' U.S. Pat. No. 4,891,762 entitled "Method and apparatus for tracking, mapping and recognition of spatial patterns". Chotiros' algorithm matches only lengths of edges in a Delaunay triangulation and thus achieves invariant matching with respect to rotation, but not with respect to scale.

In U.S. Pat. No. 6,181,806 issued to Kado et al, entitled "Apparatus for identifying a person using facial features", a method is described for recognizing faces based on matching the brightness of patches of an object with those stored in memory. The authors use triangles as the patches, but they do not use angle information, or adjacency relationships to perform spatial matching of a triangular network. Their algorithm is not scale or rotation invariant.

In Akira et al, U.S. Pat. No. 4,783,829 entitled "Pattern Recognition Apparatus", the authors propose a method which matches polygons that are similar in area, thus creating an algorithm that is not scale invariant.

BRIEF SUMMARY OF THE INVENTION

My method is based on matching of polyhedra and their appropriate adjacent and neighboring polyhedra in a tessellation of feature points. For concreteness, let the tessellation be the Delaunay triangulation in two dimensions and let us consider image data. Feature points consist of the position of the feature and labels describing that feature. The labels can be 'corner', 'line termination', or any other description of an image feature. The method then performs a search for matching triangles between the Delaunay triangulation of input feature points and the Delaunay triangulation of template feature points stored in memory. Triangles match if there is sufficient similarity in the angles and labels associated with each node, or feature point, in the triangle. Matching a single triangle represents the significant event of matching three node labels and their spatial relationships. A positive match between the angles and nodes of one triangle and its three adjacent triangles results in a total of twelve matching angles and six node labels. This is a highly discriminating and therefore useful method for performing spatial pattern recognition. Additional neighboring triangles can be examined for increased confidence of match. This method is capable of performing spatial pattern matching independent of transformations in position, rotation, and scale. Most other pattern recognition techniques do not have these properties. Lastly, a high probability of match can be achieved using a small set of adjacent and neighboring triangles and is capable of yielding a positive match even if the object is significantly occluded.

There are many ways to create tessellations. For example, we note the several common forms of tessellation: the Voronoi tesselation, the Delaunay triangulation, and the Delaunay triangulation with constraints, such as minimum weight triangulation, angular balanced triangulation, area balanced triangulation. Also many forms of tessellation are grouped under the generic labels of unstructured grid generation, mesh generation, triangulations based on quadtrees, or polyhedralization based on octrees, quadrangulation, hierarchical adaptive tesselation, adaptive polygonal tesselation, and Steiner tetrahedralization. Many of these algorithms have equivalents in three and higher dimensions.

BRIEF DESCRIPTION OF THE SEVERAL VIEWS OF THE DRAWINGS

FIG. 6 displays the probability of matching of all three angle labels in the correct cyclic order as the number of labels increases. Two sets 300 randomly generated triangles were used to create this data. For clarity, when there are 20 angle labels, the angles from 0–9 degrees are all given one label, the angles from 9–18 degrees are given a second label and so on.

DETAILED DESCRIPTION OF THE INVENTION

My method for matching spatial patterns is based on the matching of polyhedra and their appropriate adjacent and neighboring polyhedra between tessellations of the input feature points and the template feature points. The method is independent of the tessellation used or the dimension of the space. For the purposes of the detailed description of the invention, I will explain the invention using the Delaunay triangulation in two dimensions and the feature points will be based on salient features of two dimensional imagery. I use the Delaunay triangulation because of its relative speed of computation and because it tends to connect points that are near to one another. See M. Sambridge, J. Braun, and H. McQueen, "Geophysical parameterization and interpolation of irregular data using natural neighbors", Geophysical Journal International, Vol. 122, pp. 837–857, 1995, for an introduction to the Delaunay triangulation, its applications, and references to various algorithms for computing the triangulation.

Figure 1:
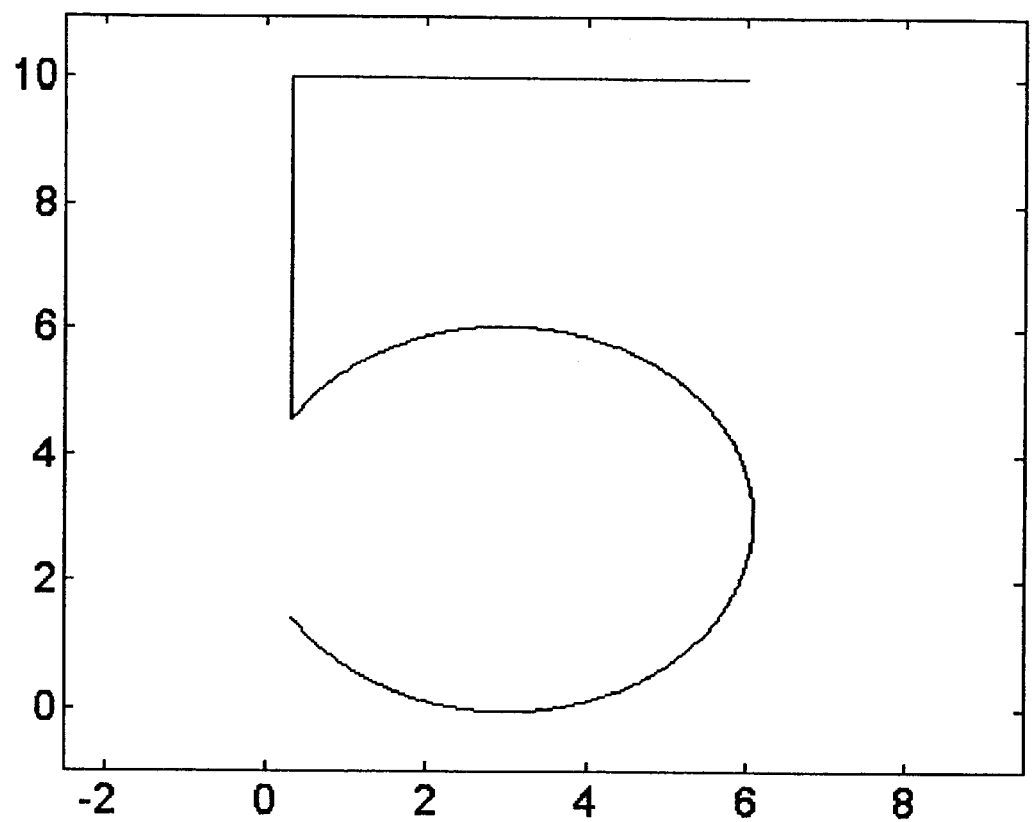
FIG. 1 displays the number '5'.
Figure 2:
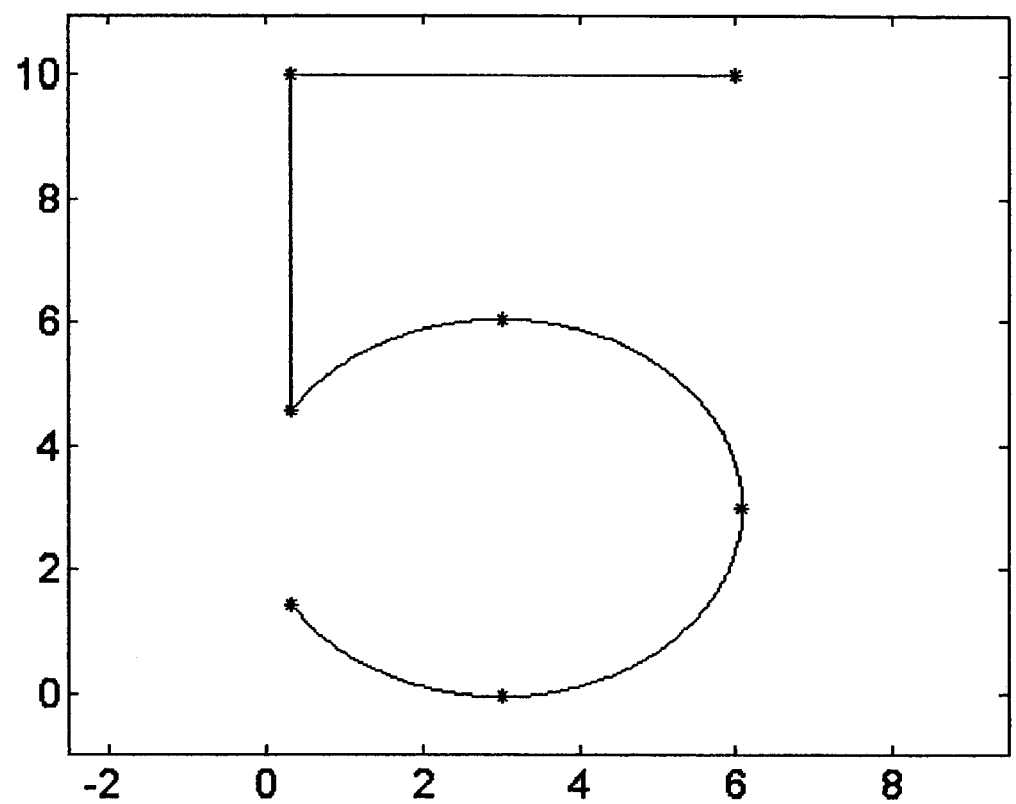
FIG. 2 displays the number '5' and the asterisks represent locations of feature points.
Figure 3:
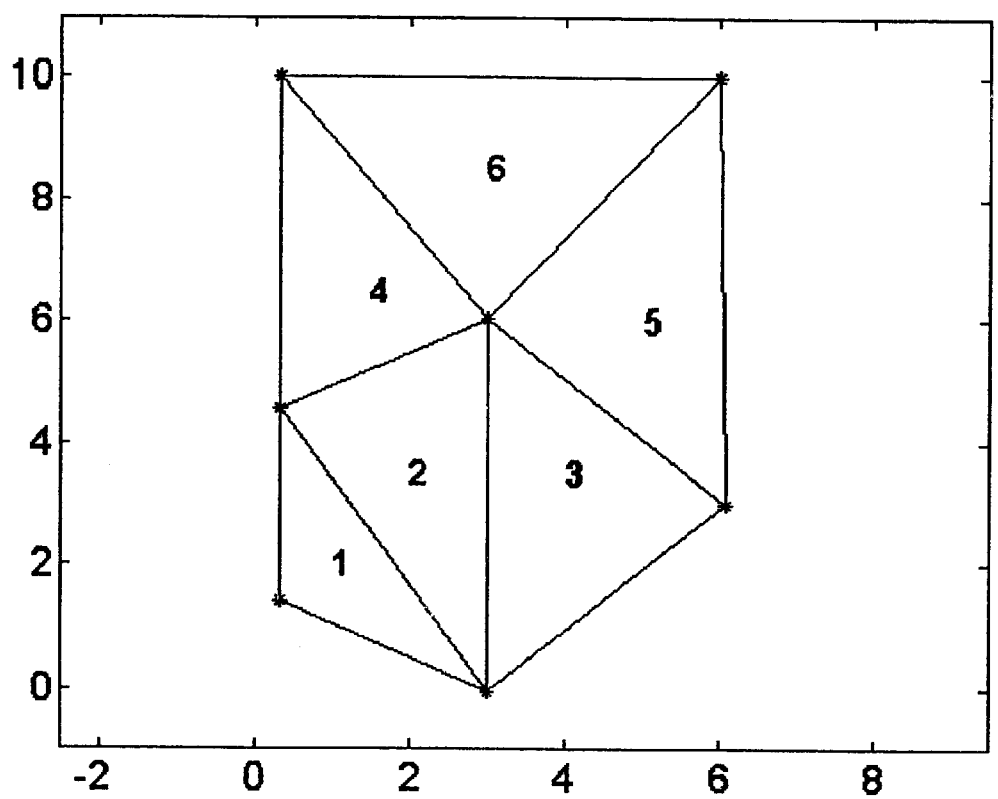
FIG. 3 displays the Delaunay triangulation of the feature points shown in FIG. 2. Each triangle is identified by a number so that adjacency relationships are easy to denote.

FIG. 1 displays a simple object, the number '5'. FIG. 2 displays the number '5' and the locations of feature points for this object as asterisks. The feature points are the salient features of line terminations, corners, and locations of high curvature. (These specific "salient features" are used for demonstration purposes only. This patent does not deal with how to create feature points from imagery or other data, but only how to match their spatial relationships.) The specific features (corner, line termination, etc.) are used as labels for the feature points. FIG. 3 displays the Delaunay triangulation of the feature points shown in FIG. 2.

From the Delaunay triangulation one can compute a list of adjacent triangles and the three angles of each triangle. Table 1 displays a list of the angles and the adjacent tringles for each triangle in FIG. 3.

TABLE 1

|  | Adjacent Triangles | | | angles | | |
|---|---|---|---|---|---|---|
| Triangle 1 | 0 | 0 | 2 | 30 | 31 | 119 |
| Triangle 2 | 3 | 1 | 4 | 89 | 61 | 30 |
| Triangle 3 | 0 | 2 | 5 | 45 | 88 | 46 |
| Triangle 4 | 2 | 0 | 6 | 34 | 85 | 61 |
| Triangle 5 | 3 | 6 | 0 | 38 | 45 | 97 |
| Triangle 6 | 5 | 4 | 0 | 56 | 53 | 71 |

Figure 4:
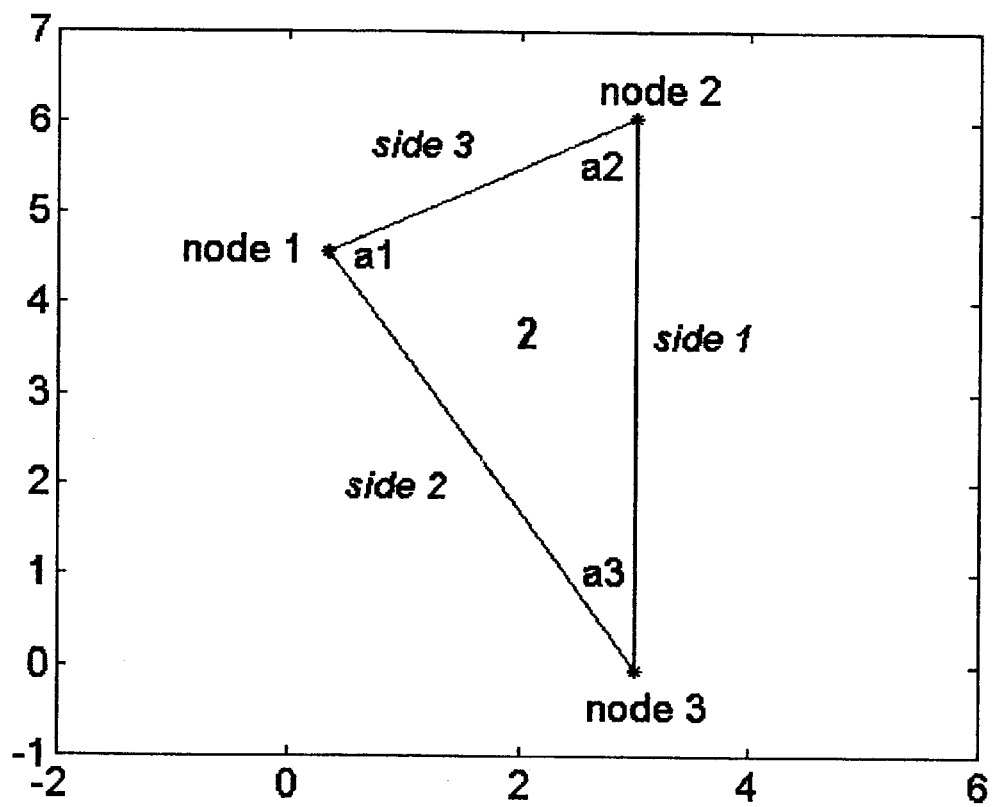
FIG. 4 displays a close up view of Triangle 2 from FIG. 3. Each node of the triangle is labeled and is uniquely associated with an angle. The angles a1, a2, and a3 represent 89, 61, and 30 degrees respectively. The sides of the triangle are directly opposite a specific node and each adjacent triangle is directly associated with a specific node.
Figure 5:
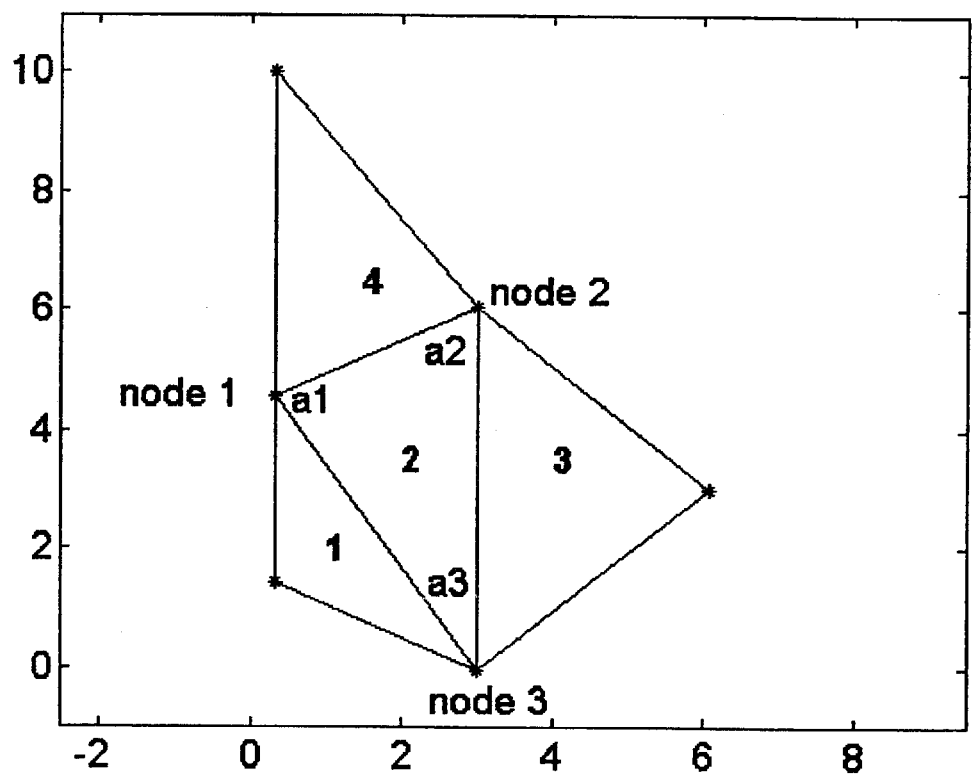
FIG. 5 displays Triangle 2 and its three adjacent triangles. Only the nodes and angles of Triangle 2 are labeled. Triangle 3 is opposite node 1, Triangle 1 is opposite node 2, and Triangle 4 is opposite node 3. Adjacent triangles are readily defined in terms of nodes and their associated angles. Thus, matching of a node angle and label immediately suggests the appropriate adjacent triangle to search for further matches.

The sum of the angles for each triangle in Table 1 is not always 180 degrees because the angles have been rounded to the nearest integer. A '0' in the 'Adjacent Triangles' columns of Table 1 indicates that side of the triangle has no neighbor. For the Delaunay triangulation shown in FIG. 3, only Triangle 2 has three adjacent triangles. FIG. 4 displays a close up view of Triangle 2 from FIG. 3. In FIG. 4 the nodes are labeled, as are their associated angular values and the side opposite each node. If a side of a triangle is shared by another triangle, then those triangles are adjacent. FIG. 5 displays Triangle 2 and its adjacent triangles. FIG. 5 demonstrates that adjacency relationships are defined geometrically and that each node has an associated angle and adjacent triangle. The phrase neighboring triangles is used to refer to those triangles that are near to a triangle, but not adjacent to it. For example, in FIG. 3, Triangle 5 and Triangle 6 are neighbors of Triangle 2.

To match an input object with a template in memory, the first step is to begin with a triangle in the list of triangles of the input, and begin looking for a similar triangle in the list of triangles from the template. Triangles are similar if there is a sufficient similarity in their angles and if there is sufficient similarity in their node labels. Once a single triangle match has been found, the next step is to examine the appropriate adjacent triangles. For example, if Triangle 2 of FIG. 3 has a match with another triangle in a template stored in memory, the next step is to examine the appropriate adjacent triangles in both the input and the template. Thus the triangles opposite the node associated with 89 degrees are compared, then the triangles opposite the nodes associated with 61 degrees are compared, and then the triangles opposite the nodes associated with 30 degrees are compared.

If all three of the appropriate adjacent triangles match their appropriate counterparts triangles in the template, then six nodes, their labels, and their spatial relationships (twelve angles) match. Depending on the conditions used for matching individual triangles, there is the possibility that matching one triangle and its three appropriate adjacent triangles is exceptionally good evidence for a positive match between the input and the template.

Figure 6:
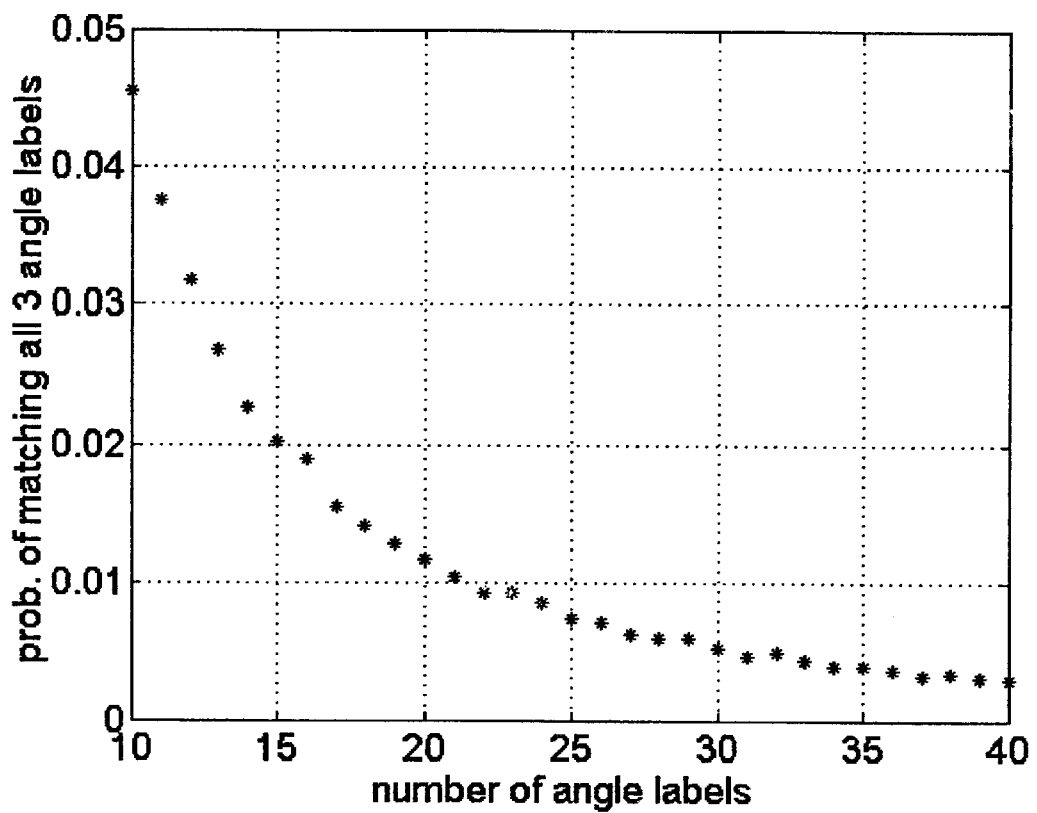

I use the phrase 'exceptionally good evidence' for a positive match based on the following reasoning. Consider the case of matching random sets of points on a plane and there are no labels to associate with these points. In this case, my method can only perform matching by comparing the angles between triangles. Also assume that the locations of the points are not measured with great accuracy and therefore the angles created by the triangulation are not expected to have perfect matches with those angles stored in a template. Let the angles be denoted by 15 different angle labels. Each angle label represents a range of angles from 0–12 degrees, 12–24 degrees, 24–36 degrees, . . . 144–156 degrees, 156–168 degrees, 168–180 degrees. One estimates that matching two angles between two random triangles occurs with a probability of approximately $3/15^2$, or 0.013333. The reasoning behind this estimate follows. Matching one angle label out of 15 occurs with probability of 1/15. Matching two labels occurs with probability $1/15^2$. The third angle does not need to be matched because only two angles are independent in a triangle. The factor of three arises from the fact that to obtain rotational invariance, the three cyclic permutations of the angles must be examined. This estimate is only approximately correct because the distribution of angles in a Delaunay triangulation is not uniform. FIG. 6 displays numerical results indicating how the probability of matching all three angle labels depends on the number of angle labels used. For 15 labels, the probability of matching the three angle labels of two randomly created triangles is approximately 0.0203. The probability of matching any four triangles, regardless of their spatial relationships, between two random patterns that have 30 triangles each is $(30^2)*(0.0302^4)$ or $1.5 \times 10^{-4}$. Matching one triangle and its three appropriate adjacent triangles occurs with an even smaller probability. Thus matching a small number of adjacent triangles is an extremely rare event, even when one allows for inaccuracy in the angle matches and does not consider additional node labels that would further increase this algorithms ability to discriminate spatial patterns.

Figure 7:
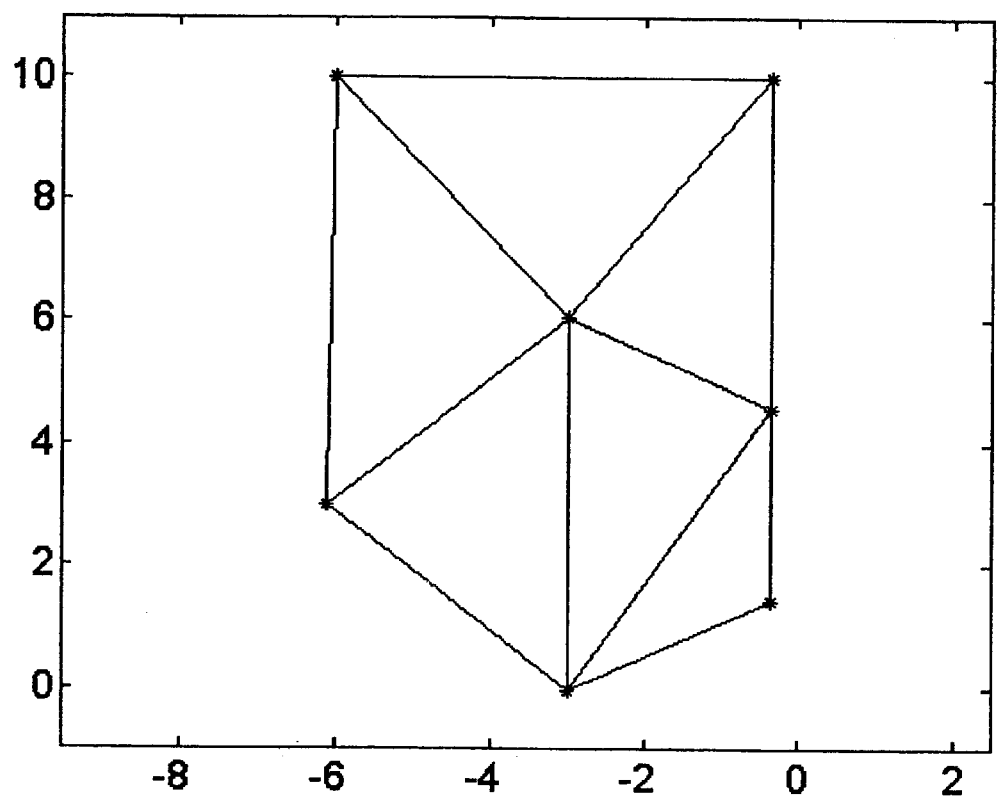
FIG. 7 displays the Delaunay triangulation for the mirror image of the feature points of the number '5' shown in FIG. 2. Note that the angles of the triangles and the adjacency relationships between neighboring triangles are not changed by this transformation of coordinates.

FIG. 7 displays the Delaunay triangulation for the points representing the reflection of the feature points of the number '5' shown in FIG. 2. Note that this mirror image of the number '5' results in a triangulation in which the angles of each triangle are the same and the adjacency relationships are identical. The difference is that the angles of the triangles have been non-cyclically permuted. One can use this difference to recognize objects that are the mirror reflection of templates stored in memory.

Matching triangles becomes a more accurate method of performing object recognition when one also considers that each node can contain a label that describes some form of visual information. For the case of the number '5', this label is a line termination, a corner and the angle it subtends, or a label specifying the radius of curvature for a salient portion of a curve. The features of each node need not be restricted to low-level visual features such as corners, curvature, or line terminations. The visual features can be more complex, such as an eye, a nose, or an eyebrow. Depending on the uniqueness of the node labels, one can imagine cases in which a search based on matching node labels is more efficient than searching for matching angles.

Figure 8:
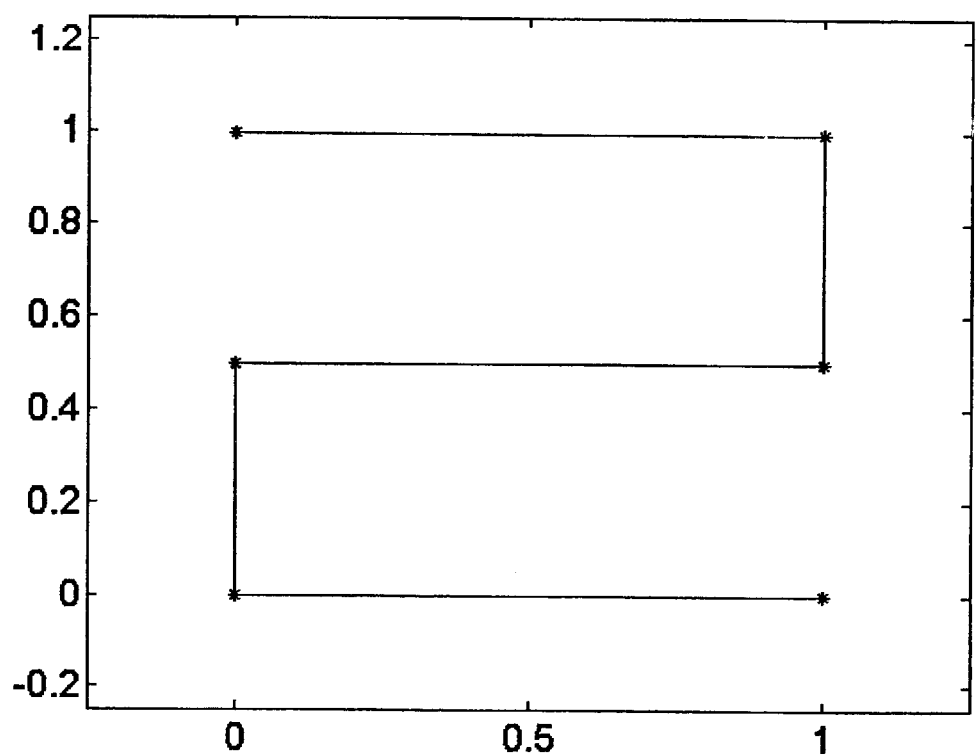
FIG. 8 displays the number '2' and the asterisks represent locations of feature points.
Figure 9:
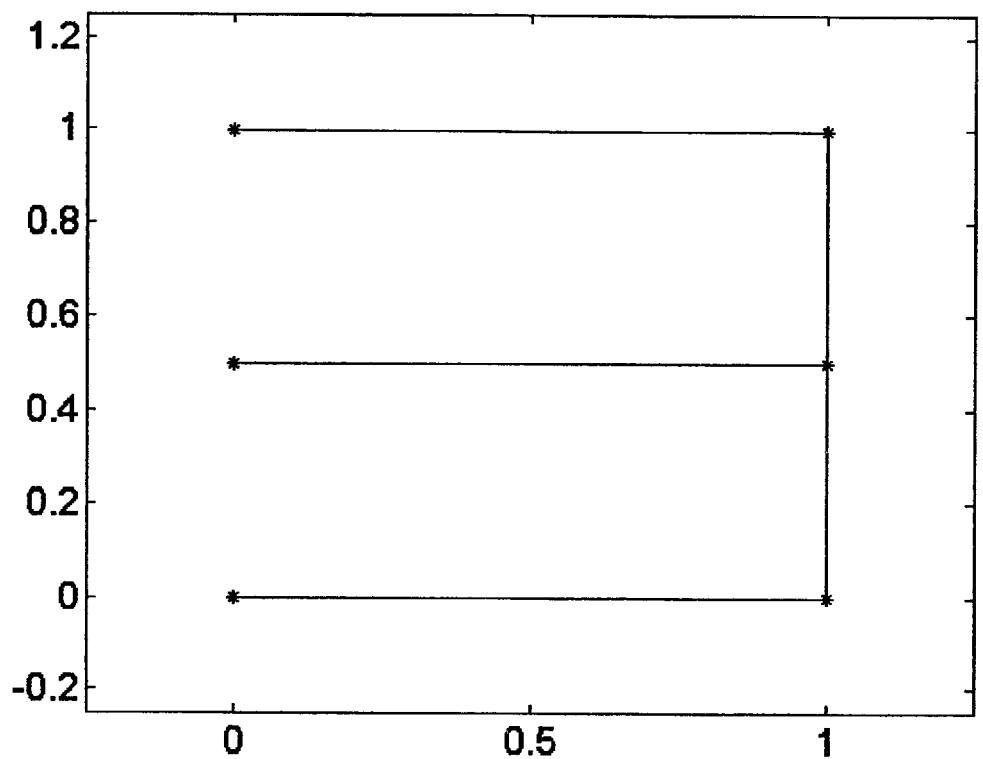
FIG. 9 displays the number '3' and the asterisks represent locations of feature points.
Figure 10:
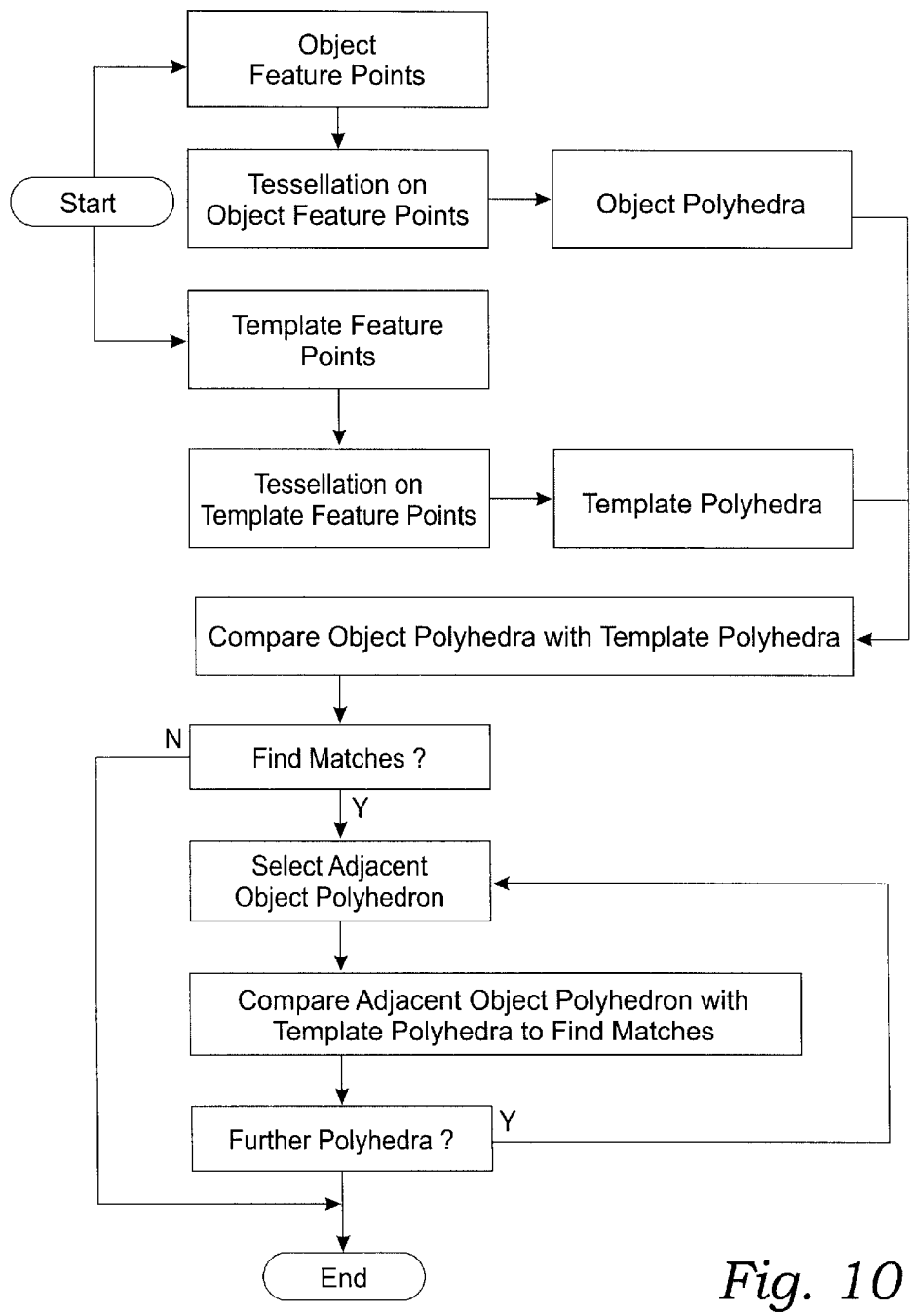
FIG. 10 is a block diagram of the present invention method.

As an example of the importance of node labels, consider the following example. In FIG. 8 and FIG. 9 the numbers '2' and '3' are drawn as they might appear on an LCD display. Both numbers have feature points at the same locations (all feature points are corners, 'T' junctions, or line terminations). Because the feature points are at the same locations, the resulting Delaunay triangulation is identical, thus node labels are the only distinguishing information in this example. The '3' is differentiated from the '2' by having one 'T' junction, three line terminations, and two corners. The '2' has no 'T' junction, two line terminations, and four corners. Because node labels are based on visual information at each node, the algorithm can differentiate between objects that have identical feature point locations.

Note that a handwritten number '2' can have significantly different appearances and salient feature points than the '2' shown in FIG. 6. For practical applications, it may be necessary to have several different triangulation templates to match the wide variety of handwritten '2's that exist.

My matching method is position, rotation, and scale invariant because the angles and labels associated with each node are used to determine similarity of triangles. The angle between nodes does not change if the locations of the nodes are translated, rotated, or rescaled. If these locations undergo an affine or nonlinear transformation, then it is possible for the underlying triangulation to change and thereby affect the accuracy of the match. Note that the Delaunay triangulation is not scale invariant because the resultant triangles increase in size if the separation between the points increases in size. Since the method uses the similarity in angles and nodes, and this is not dependent on the size of the triangle, my matching method is scale invariant.

Further, note that my method for performing spatial recognition is powerful because it is based on local information. If a dozen appropriate adjacent and neighboring triangles of an object are matched with a template in memory, and each triangle has a probability of 0.0203 of being matched randomly, then there is exceptional evidence of a positive match, even if there are a thousand triangles in the tessellations being compared. This indicates that considerable occlusion or deformation exists.

My method allows for a simple and generic matching of spatial relationships between image features that has not been described in the literature of pattern recognition, nor in patent databases.

The applications of my algorithm are numerous. The most obvious application is object recognition. Other applications include registration of two images. This is useful in stereoscopic matching, satellite image registration, and the registration of medical images.

Furthermore, my algorithm does not necessarily depend on the Delaunay triangulation to perform matches of triangles. Other tessellation algorithms can be used to generate polygons based on the location of feature points. Matching an individual polygon and its appropriate adjacent and neighboring polygons is a conceptually identical to my method of matching spatial relationships. Details of the implementation, search, and decision making process will be different, but the basic idea underlying the algorithm is identical to that presented here. This algorithm can also use tessellation algorithms in three and higher dimensions to create polyhedra that are searched to perform spatial pattern matching in those dimensions.

Lastly, my algorithm can be used to match feature points in parameter space. For example, in the auditory domain a word can be represented by feature points whose locations are given in units of time, amplitude, and frequency. The tessellation of feature points can be done regardless of the units of the dimensions, thus this algorithm can be used for matching spatial structures in parameter space.

What is claimed is:

1. A method for matching spatial patterns between a set of object feature points and a set of template feature points comprising the steps of:

a) performing tessellations on the set of object feature points and the set of template feature points, thereby forming a set of object polyhedra and a set of template polyhedra respectively;

b) comparing, angles and feature points of the polyhedra, between at least one of the object polyhedron, from the set of object polyhedra, and, in turn, each of the template polyhedra, from the set of template polyhedra, to find at least one match therebetween;

c) selecting, an object polyhedron, that lies adjacent to a matched one of the object polyhedra;

d) comparing, angles and feature points of the polyhedra, between the selected one of the adjacent object polyhedra and a similar adjacent polyhedron of a corresponding said matched template polyhedron;

e) repeating steps (c) and (d) until it is possible to determine if a spatial pattern match exists between the set of object feature points and the set of template feature points.

2. The method of claim 1 wherein the object and template polyhedra are formed using a Delaunay triangulation.

3. The method of claim 1 wherein the object and template feature points are obtained from image information including at least one of: spots, edges, lines, corners, line terminations, line crossings, red points, eyes, wheels, nostrils, and mouths.

4. The method of claim 1 wherein the match criterion is one of: a selected quantity of the feature points matched, a level of discrepancy between the angles matched, and a quantity of polyhedra matched.

* * * * *